(12) United States Patent
Xi et al.

(10) Patent No.: US 9,645,671 B2
(45) Date of Patent: May 9, 2017

(54) ARRAY SUBSTRATE, DISPLAY PANEL AND DISPLAY DEVICE

(71) Applicants: Shanghai AVIC OPTO Electronics Co., Ltd., Shanghai (CN); Tianma Micro-Electronics Co., Ltd., Shenzhen (CN)

(72) Inventors: Kerui Xi, Shanghai (CN); Zhaokeng Cao, Shanghai (CN)

(73) Assignees: SHANGHAI AVIC OPTO ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 5 days.

(21) Appl. No.: 14/958,761

(22) Filed: Dec. 3, 2015

(65) Prior Publication Data

US 2016/0291778 A1 Oct. 6, 2016

(30) Foreign Application Priority Data

Apr. 1, 2015 (CN) .......................... 2015 1 0152869

(51) Int. Cl.
*G06F 3/041* (2006.01)
*G06F 3/046* (2006.01)
*G06F 3/044* (2006.01)

(52) U.S. Cl.
CPC ............ *G06F 3/0416* (2013.01); *G06F 3/044* (2013.01); *G06F 3/046* (2013.01); *G06F 3/0412* (2013.01)

(58) Field of Classification Search
CPC ...... G06F 3/0416; G06F 3/046; G06F 3/0412; G06F 3/044
See application file for complete search history.

(56) References Cited

U.S. PATENT DOCUMENTS

2010/0328249 A1* 12/2010 Ningrat .................. G06F 3/046
345/174

* cited by examiner

*Primary Examiner* — Charles Hicks
(74) *Attorney, Agent, or Firm* — Alston & Bird LLP

(57) ABSTRACT

Array substrate, display panel and display device are provided. The array substrate includes: N sensor units; N signal detection terminals; a first control signal terminal; and a reference signal terminal, wherein $i^{th}$ sensor unit comprises inductor, capacitor and first switch transistor, first terminal of inductor and first polar plate of capacitor are connected with $i^{th}$ signal detection terminal, second terminal of inductor is connected with first terminal of first switch transistor, second polar plate of capacitor and second terminal of first switch transistor are connected with reference signal terminal, control terminal of first switch transistor is connected with first control signal terminal, during capacitive touch control stage, first switch transistor is turned off, and $i^{th}$ signal detection terminal outputs a capacitive detection signal; during inductive touch control stage, first switch transistor is turned on, and $i^{th}$ signal detection terminal outputs inductive detection signal. Thickness of the display device is reduced.

19 Claims, 7 Drawing Sheets

ARRAY SUBSTRATE, DISPLAY PANEL AND DISPLAY DEVICE

CROSS-REFERENCE TO RELATED APPLICATIONS

The present application claims priority to Chinese patent application No. 201510152869.2, filed with the People's Republic of China on Apr. 1, 2015, and entitled "ARRAY SUBSTRATE, DISPLAY PANEL AND DISPLAY DEVICE", and the entire disclosure of which is incorporated herein by reference.

FIELD OF THE DISCLOSURE

The present disclosure generally relates to touch control display technology, and more particularly, to an array substrate, a display panel and a display device.

BACKGROUND OF THE DISCLOSURE

A touch display device allows a user to input instructions by touching, using a finger, or other tools to a touch screen of the device. When the finger or the tool contacts with the touch screen, the device can detect a touched region, and display particular contents according to the input instructions corresponding to the detected touched region. Currently touch display devices can be classified into capacitive touch display devices and inductive touch display devices. In existing capacitive touch display devices and inductive touch display devices, touch screens are generally independent from display devices. As a result, thickness of the devices may be great.

SUMMARY OF THE DISCLOSURE

Embodiments of the present disclosure provide an array substrate, a display panel and a display device. Sensor units are integrated on the array substrate to reduce the thickness of the display device. Besides, capacitive touch control and inductive touch control are provided for the sensor units. Therefore, the display device using such an array substrate may be widely used in various circumstances.

In an embodiment of the present disclosure, an array substrate is provided, including: N sensor units; N signal detection terminals; a first control signal terminal; and a reference signal terminal, wherein the $i^{th}$ sensor unit includes an inductor, a capacitor and a first switch transistor, a first terminal of the inductor and a first polar plate of the capacitor are both connected with the $i^{th}$ signal detection terminal, a second terminal of the inductor is connected with a first terminal of the first switch transistor, a second polar plate of the capacitor and a second terminal of the first switch transistor are both connected with the reference signal terminal, and a control terminal of the first switch transistor is connected with the first control signal terminal The array substrate can work on a capacitive touch control stage and an inductive touch control stage. During the capacitive touch control stage, the first switch transistor is turned off under the control of the first control signal terminal, and the $i^{th}$ signal detection terminal outputs a capacitive detection signal; and during the inductive touch control stage, the first switch transistor is turned on under the control of the first control signal terminal, and the $i^{th}$ signal detection terminal outputs an inductive detection signal, wherein N is a positive integer, and $1 \leq i \leq N$.

In an embodiment of the present disclosure, a display panel including the above array substrate is provided.

In an embodiment of the present disclosure, a display device including the above display panel is provided.

Compared with the techniques, embodiments of the present disclosure may have following advantages. In the embodiments of the present disclosure, an array substrate, a display panel and a display device are provided. The array substrate includes: N sensor units; N signal detection terminals; a first control signal terminal; and a reference signal terminal, wherein the $i^{th}$ sensor unit includes an inductor, a capacitor and a first switch transistor, a first terminal of the inductor and a first polar plate of the capacitor are both connected with the $i^{th}$ signal detection terminal, a second terminal of the inductor is connected with a first terminal of the first switch transistor, a second polar plate of the capacitor and a second terminal of the first switch transistor are both connected with the reference signal terminal, and a control terminal of the first switch transistor is connected with the first control signal terminal. The array substrate can work on a capacitive touch control stage and an inductive touch control stage. During the capacitive touch control stage, the first switch transistor is turned off under the control of the first control signal terminal, and the $i^{th}$ signal detection terminal outputs a capacitive detection signal. During the inductive touch control stage, the first switch transistor is turned on under the control of the first control signal terminal, and the $i^{th}$ signal detection terminal outputs an inductive detection signal, wherein N is a positive integer, and $1 \leq i \leq N$.

From above, in the embodiments of the present disclosure, the sensor units are integrated on the array substrate, which differs from mounting a touch screen on a display device in the existing techniques. Thus, the thickness of the display device may be reduced effectively. Besides, both the capacitive touch control mode and the inductive touch control mode are provided for the sensor units, and the two modes can be switched to each other, thus, the touch control mode can be selected according to practical application scenarios. Therefore, the display device using such an array substrate may be widely used in various circumstances.

BRIEF DESCRIPTION OF THE DRAWINGS

In order to clarify the objects, characteristics and advantages of the disclosure and related art, embodiments of present disclosure will be described in detail in conjunction with accompanying drawings of both the disclosure and related art. The drawings are just examples and do not limit the scope of the disclosure, and other drawings may be obtained by a person of ordinary skill in the art based on these drawings without creative work.

DETAILED DESCRIPTION OF THE DISCLOSURE

Embodiments of present disclosure will be described in detail in conjunction with accompanying drawings. The embodiments below are only described for example, and there are many other possible embodiments. Based on the embodiments below, all the other embodiments obtained by those skilled in the art without any creative efforts should belong to the scope of the present disclosure.

As described in the background, in existing capacitive touch display devices and inductive touch display devices, a touch screen is generally independent from a display device, which leads to a relatively great thickness of the devices.

In embodiments of the present disclosure, an array substrate is provided. Sensor units are integrated on the array substrate, which may reduce the thickness of the entire device. Array substrates provided in embodiments are described in detail below in conjunction with FIGS. 1 to 6c.

Figure 1:
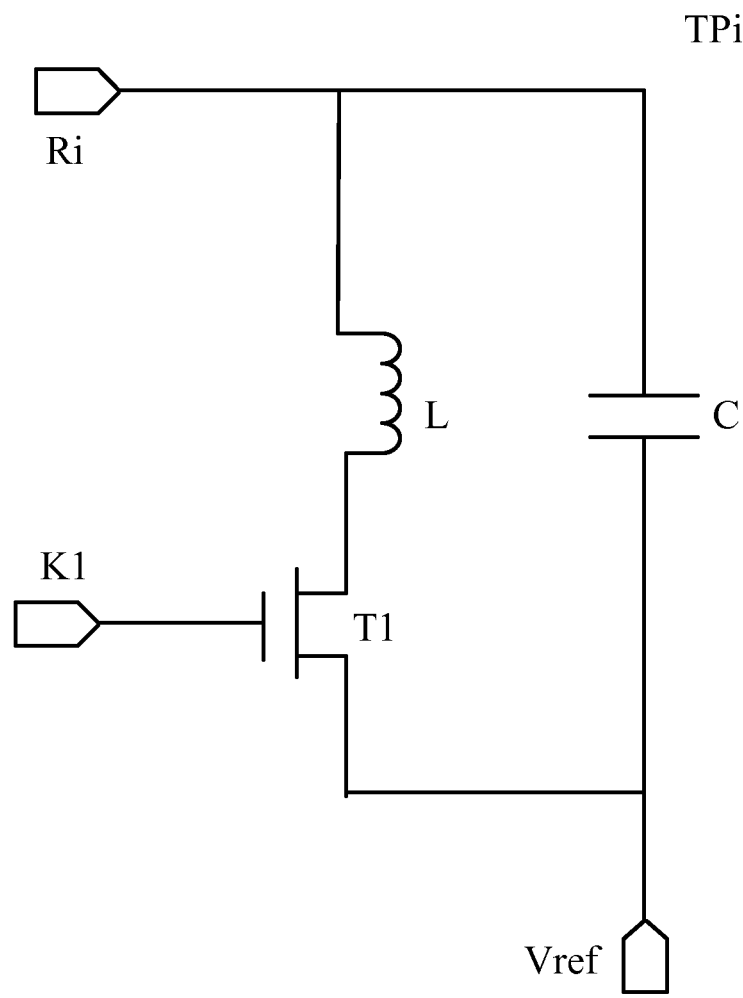
FIG. 1 schematically illustrates a structural diagram of a sensor unit according to an embodiment of the present disclosure.

In one embodiment, an array substrate is provided. The array substrate includes N sensor units, N signal detection terminals, a first control signal terminal K1 and a reference signal terminal Vref. N is a positive integer. FIG. 1 schematically illustrates a structural diagram of a sensor unit TPi according to one embodiment. The sensor unit TPi is designated as the $i^{th}$ sensor unit of the array substrate, where $1 \leq i \leq N$. Referring to FIG. 1, the $i^{th}$ sensor unit TPi includes an inductor L, a capacitor C and a first switch transistor T1. A first terminal of the inductor L and a first polar plate of the capacitor C are both connected with the $i^{th}$ signal detection terminal Ri. A second terminal of the inductor L is connected with a first terminal of the first switch transistor T1. A second polar plate of the capacitor C and a second terminal of the first switch transistor T1 are both connected with the reference signal terminal Vref. And a control terminal of the first switch transistor T1 is connected with the first control signal terminal K1. The array substrate can work in a capacitive touch control stage and an inductive touch control stage. During the capacitive touch control stage, the first switch transistor T1 is turned off under the control of the first control signal terminal K1, and the $i^{th}$ signal detection terminal Ri outputs a capacitive detection signal. During the inductive touch control stage, the first switch transistor T1 is turned on under the control of the first control signal terminal K1, and the $i^{th}$ signal detection terminal Ri outputs an inductive detection signal.

From above, the sensor units can be switched between a capacitive touch control mode and an inductive touch control mode. When inductive touch control is required, the sensor units can be switched to inductive touch control stage under the control of the first control signal terminal. When capacitive touch control is required, the sensor units can be switched to capacitive touch control stage under the control of the first control signal terminal. Therefore, a display device using such an array substrate integrated with such sensor units can be widely used in various circumstances. The thickness of the display device may be reduced by arranging the sensor units in the manner described in various embodiments of the present disclosure.

Further, to improve the detection accuracy when capacitive touch control is applied, in some embodiments, several sensor units may be connected through a connection unit. When the device is switched to the capacitive touch control stage, capacitors in these sensor units are connected in parallel. As a result, an equivalent capacitor with an enlarged polar plate is generated. Thus, detection capacity in the capacitive touch control stage and touch control accuracy of the display device are improved.

In some embodiments, the array substrate may further include: a connection unit and a second control signal terminal, wherein a control terminal of the connection unit is connected with the second control signal terminal. During the capacitive touch control stage, the first switch transistor is turned off under the control of the first control signal terminal, the connection unit connects capacitors in the N sensor units in parallel under the control of the second control signal terminal, and at least one of the N signal detection terminals outputs a capacitive detection signal. During the inductive touch control stage, the first switch transistor is turned on under the control of the first control signal terminal, the connection unit disconnects the connection of the capacitors in the N sensor units under the control of the second control signal terminal, and each of the N signal detection terminals outputs an inductive detection signal.

Embodiments of present disclosure where a plurality of sensor units are connected will be described in detail in conjunction with accompanying drawings.

Figure 2:
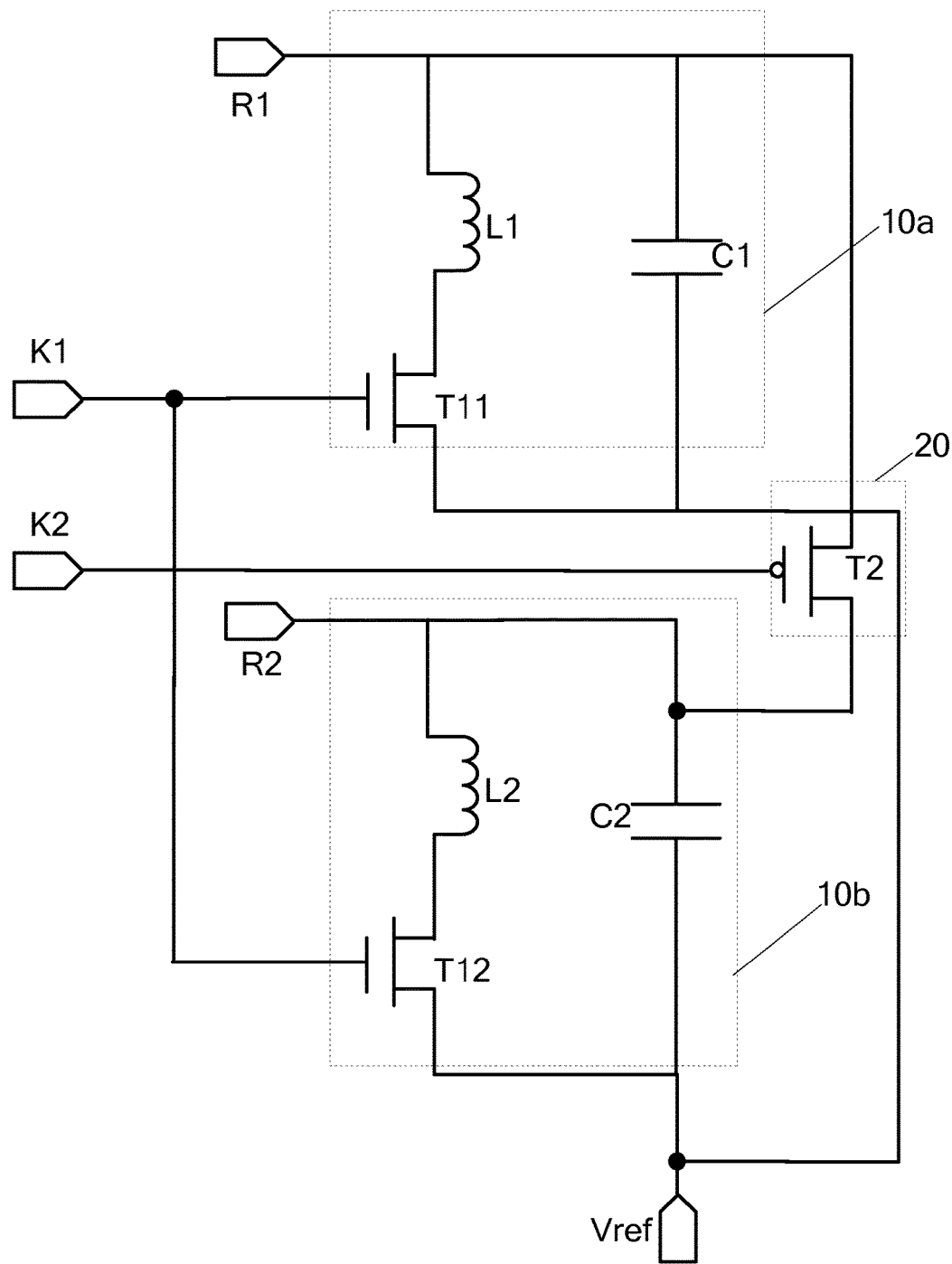
FIG. 2 schematically illustrates a structural diagram of two connected sensor units according to an embodiment of the present disclosure.

FIG. 2 schematically illustrates a structural diagram of two connected sensor units according to an embodiment of the present disclosure.

The array substrate further includes a connection unit 20 and a second control signal terminal K2, where a control terminal of the connection unit 20 is connected with the second control signal terminal K2. The connection unit 20 includes a second switch transistor T2, where a first terminal of the second switch transistor T2 is connected with a first polar plate of a capacitor C1 in first sensor unit 10a, a second terminal of the second switch transistor T2 is connected with a first polar plate of a capacitor C2 in second sensor unit 10b, and a control terminal of the second switch transistor T2 is connected with the second control signal terminal K2.

In the first sensor unit 10a, a first terminal of an inductor L1 and a first polar plate of the capacitor C1 are both connected with a first signal detection terminal R1, a second terminal of the inductor L1 is connected with a first terminal of a first switch transistor T11, a second polar plate of the capacitor C1 and a second terminal of the first switch transistor T11 are both connected with a reference signal terminal Vref, and a control terminal of the first switch transistor T11 is connected with a first control signal terminal K1. In the second sensor unit 10b, a first terminal of an inductor L2 and a first polar plate of the capacitor C2 are both connected with a second signal detection terminal R2, a second terminal of the inductor L2 is connected with a first terminal of a first switch transistor T12, a second polar plate of the capacitor C2 and a second terminal of the first switch transistor T12 are both connected with the reference signal terminal Vref, and a control terminal of the first switch transistor T12 is connected with the first control signal terminal K1.

During a capacitive touch control stage, the first switch transistors T11 and T12 are turned off under the control of the first control signal terminal K1, the connection unit 20 connects the capacitors in the two sensor units 10a and 10b in parallel under the control of the second control signal terminal K2, and at least one of the two signal detection terminals R1 and R2 outputs a capacitive detection signal; or during an inductive touch control stage, the first switch transistors T11 and T12 are turned on under the control of the first control signal terminal K1, the connection unit 20 disconnects the connection of the capacitors in the two sensor units 10a and 10b under the control of the second control signal terminal K2, and both the first signal detection terminal R1 and the second signal detection terminal R2 output an inductive detection signal, where the first sensor unit 10a and the second sensor unit 10b are two independent sensor units in inductive touch control mode.

Figure 3:
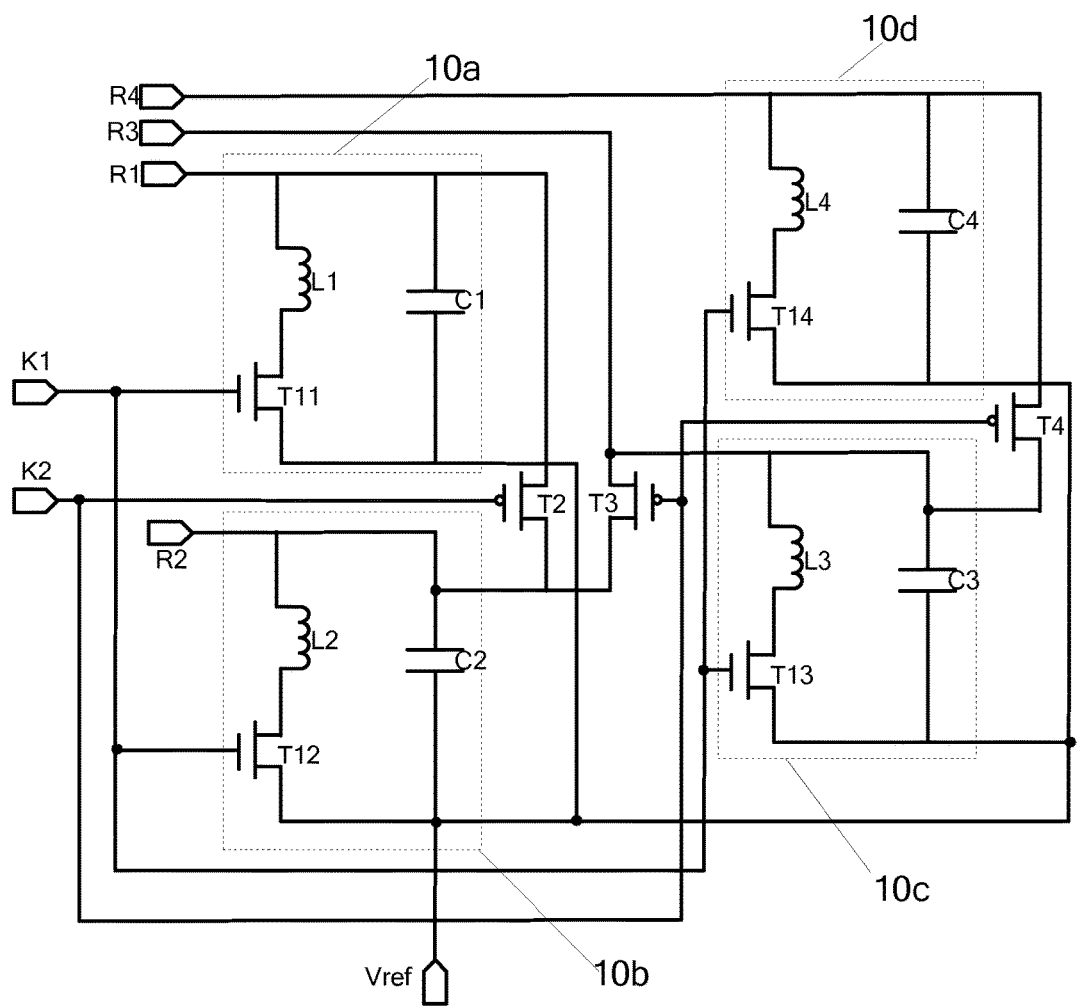
FIG. 3 schematically illustrates a structural diagram of a first number of connected sensor units according to an embodiment of the present disclosure, the first number being an even number greater than three.

FIG. 3 schematically illustrates a structural diagram of a first number of connected sensor units according to an embodiment of the present disclosure, the first number being an even number greater than three. An array substrate includes connection units and a second control signal terminal K2, where control terminals of the connection units are connected with the second control signal terminal K2. The connection units include $2^{nd}$ to $N^{th}$ switch transistors. In some embodiments, N is an even integer greater than 3. A first terminal of the $j^{th}$ switch transistor is connected with a first polar plate of a capacitor C in the j–$1^{th}$ sensor unit, a second terminal of the $j^{th}$ switch transistor is connected with a first polar plate of a capacitor C in the $j^{th}$ sensor unit, and a control terminal of the $j^{th}$ switch transistor is connected with the second control signal terminal K2. A first terminal of the j+$1^{th}$ switch transistor is connected with a first polar plate of a capacitor C in the j+$1^{th}$ or j+$2^{th}$ sensor unit, a second terminal of the j+$1^{th}$ switch transistor is connected with the first polar plate of the capacitor C in the $j^{th}$ sensor unit, and a control terminal of the j+$1^{th}$ switch transistor is connected with the second control signal terminal K2, where j is an even number greater than 1 and not greater than N.

In FIG. 3, four sensor units (10a, 10b, 10c, and 10d) are illustrated for example. The connection units include a second switch transistor T2, a third switch transistor T3 and a fourth switch transistor T4. A first terminal of the second switch transistor T2 is connected with a first polar plate of a capacitor C1 in the first sensor unit 10a, a second terminal of the second switch transistor T2 is connected with a first polar plate of a capacitor C2 in the second sensor unit 10b, and a control terminal of the second switch transistor T2 is connected with the second control signal terminal K2. A first terminal of the third switch transistor T3 is connected with a first polar plate of a capacitor C3 in the third sensor unit 10c or/and a first polar plate of a capacitor C4 in the fourth sensor unit 10d, a second terminal of the third switch transistor T3 is connected with the first polar plate of the capacitor C2 in the second sensor unit 10b, and a control terminal of the third switch transistor T3 is connected with the second control signal terminal K2. A first terminal of the fourth switch transistor T4 is connected with a first polar plate of a capacitor C3 in the third sensor unit 10c, a second terminal of the fourth switch transistor T4 is connected with a first polar plate of a capacitor C4 in the fourth sensor unit 10d, and a control terminal of the fourth switch transistor T4 is connected with the second control signal terminal K2.

In the first sensor unit 10a, a first terminal of an inductor L1 and a first polar plate of the capacitor C1 are both connected with a first signal detection terminal R1, a second terminal of the inductor L1 is connected with a first terminal of a first switch transistor T11, a second polar plate of the capacitor C1 and a second terminal of the first switch transistor T11 are both connected with a reference signal terminal Vref, and a control terminal of the first switch transistor T11 is connected with a first control signal terminal K1.

In the second sensor unit 10b, a first terminal of an inductor L2 and a first polar plate of the capacitor C2 are both connected with a second signal detection terminal R2, a second terminal of the inductor L2 is connected with a first terminal of a first switch transistor T12, a second polar plate of the capacitor C2 and a second terminal of the first switch transistor T12 are both connected with the reference signal terminal Vref, and a control terminal of the first switch transistor T12 is connected with the first control signal terminal K1.

In the third sensor unit 10c, a first terminal of an inductor L3 and a first polar plate of the capacitor C3 are both connected with a third signal detection terminal R3, a second terminal of the inductor L3 is connected with a first terminal of a first switch transistor T13, a second polar plate of the capacitor C3 and a second terminal of the first switch transistor T13 are both connected with the reference signal terminal Vref, and a control terminal of the first switch transistor T13 is connected with the first control signal terminal K1.

In the fourth sensor unit 10d, a first terminal of an inductor L4 and a first polar plate of the capacitor C4 are both connected with a fourth signal detection terminal R4, a second terminal of the inductor L4 is connected with a first terminal of a first switch transistor T14, a second polar plate of the capacitor C4 and a second terminal of the first switch transistor T14 are both connected with the reference signal terminal Vref, and a control terminal of the first switch transistor T14 is connected with the first control signal terminal K1.

During a capacitive touch control stage, the first switch transistors T11, T12, T13 and T14 are turned off under the control of the first control signal terminal K1, the connection units connect the capacitors in the four sensor units in parallel under the control of the second control signal terminal K2, and at least one of the four signal detection terminals R1, R2, R3 and R4 outputs a capacitive detection signal. During an inductive touch control stage, the first switch transistors T11, T12, T13 and T14 are turned on under the control of the first control signal terminal K1, the connection units disconnect the connection of the capacitors in the four sensor units under the control of the second control signal terminal K2, and each of the four signal detection terminals R1, R2, R3 and R4 outputs an inductive detection signal.

Figure 4:
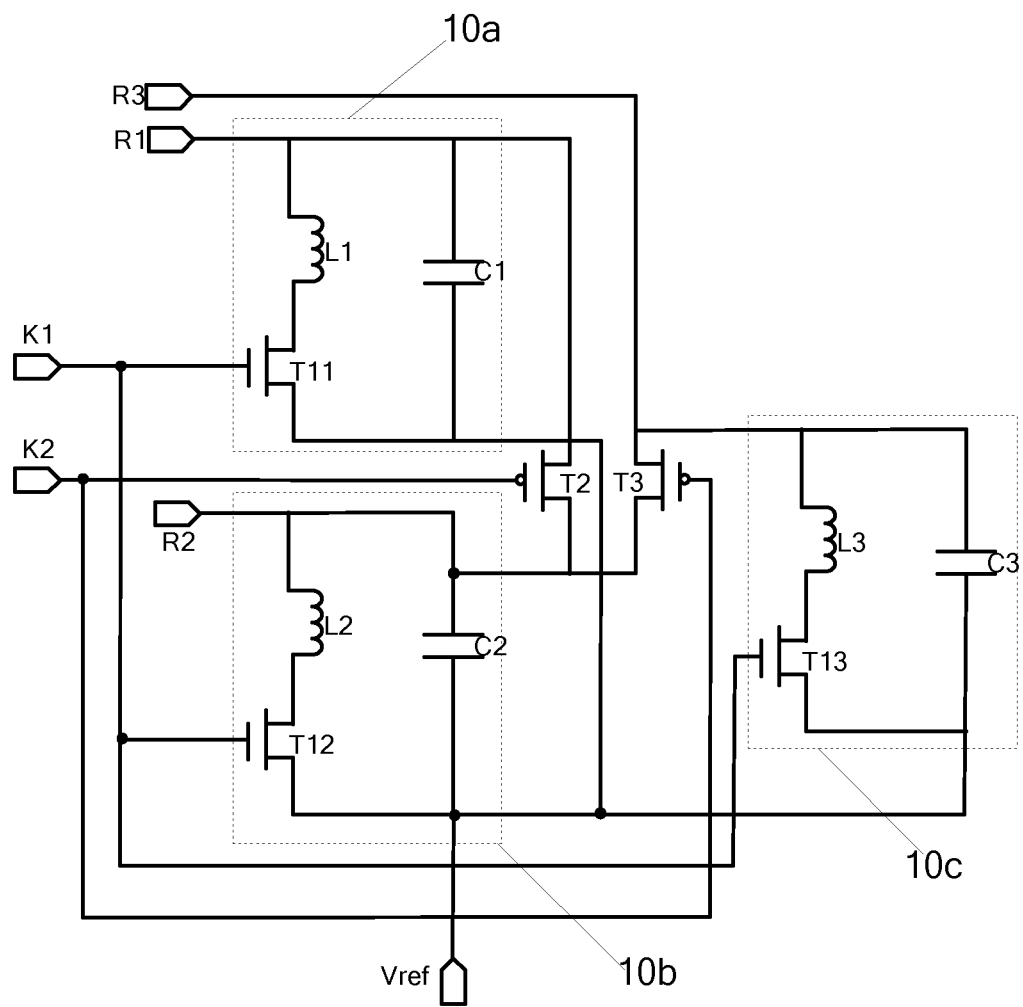
FIG. 4 schematically illustrates a structural diagram of a second number of connected sensor units according to an embodiment of the present disclosure, the second number being an odd number greater than two.

Referring to FIG. 4, FIG. 4 schematically illustrates a structural diagram of a second number of connected sensor units according to an embodiment of the present disclosure, the second number being an odd number greater than two.

An array substrate includes connection units and a second control signal terminal K2, where control terminals of the connection units are connected with the second control signal terminal K2. The connection units include $2^{nd}$ to $N^{th}$ switch transistors. A first terminal of the $j^{th}$ switch transistor is connected with a first polar plate of a capacitor C in the $j-1^{th}$ sensor unit, a second terminal of the $j^{th}$ switch transistor is connected with a first polar plate of a capacitor C in the $j^{th}$ sensor unit, and a control terminal of the $j^{th}$ switch transistor is connected with the second control signal terminal K2. A first terminal of the $j+1^{th}$ switch transistor is connected with a first polar plate of a capacitor C in the $j+1^{th}$ sensor unit, a second terminal of the $j+1^{th}$ switch transistor is connected with the first polar plate of the capacitor C in the $j^{th}$ sensor unit, and a control terminal of the $j+1^{th}$ switch transistor is connected with the second control signal terminal K2, where j is an even number greater than 1 and less than N.

In FIG. 4, three sensor units are illustrated for example. The connection units include a second switch transistor T2 and a third switch transistor T3. A first terminal of the second switch transistor T2 is connected with a first polar plate of a capacitor C1 in the first sensor unit 10a, a second terminal of the second switch transistor T2 is connected with a first polar plate of a capacitor C2 in the second sensor unit 10b, and a control terminal of the second switch transistor T2 is connected with the second control signal terminal K2. A first terminal of the third switch transistor T3 is connected with a first polar plate of a capacitor C3 in the third sensor unit 10c, a second terminal of the third switch transistor T3 is connected with the first polar plate of the capacitor C2 in the second sensor unit 10b, and a control terminal of the third switch transistor T3 is connected with the second control signal terminal K2.

In the first sensor unit 10a, a first terminal of an inductor L1 and a first polar plate of the capacitor C1 are both connected with a first signal detection terminal R1, a second terminal of the inductor L1 is connected with a first terminal of a first switch transistor T11, a second polar plate of the capacitor C1 and a second terminal of the first switch transistor T11 are both connected with a reference signal terminal Vref, and a control terminal of the first switch transistor T11 is connected with a first control signal terminal K1.

In the second sensor unit 10b, a first terminal of an inductor L2 and a first polar plate of the capacitor C2 are both connected with a second signal detection terminal R2, a second terminal of the inductor L2 is connected with a first terminal of a first switch transistor T12, a second polar plate of the capacitor C2 and a second terminal of the first switch transistor T12 are both connected with the reference signal terminal Vref, and a control terminal of the first switch transistor T12 is connected with the first control signal terminal K1.

In the third sensor unit 10c, a first terminal of an inductor L3 and a first polar plate of the capacitor C3 are both connected with a third signal detection terminal R3, a second terminal of the inductor L3 is connected with a first terminal of a first switch transistor T13, a second polar plate of the capacitor C3 and a second terminal of the first switch transistor T13 are both connected with the reference signal terminal Vref, and a control terminal of the first switch transistor T13 is connected with the first control signal terminal K1.

During a capacitive touch control stage, the first switch transistors T11, T12 and T13 are turned off under the control of the first control signal terminal K1, the connection units connect the capacitors in the three sensor units in parallel under the control of the second control signal terminal K2, and at least one of the three signal detection terminals R1, R2 and R3 outputs a capacitive detection signal. During an inductive touch control stage, the first switch transistors T11, T12 and T13 are turned on under the control of the first control signal terminal K1, the connection units disconnect the connection of the capacitors in the three sensor units under the control of the second control signal terminal K2, and each of the three signal detection terminals R1, R2 and R3 outputs an inductive detection signal.

It should be noted that, in some embodiments, the reference signal terminal may be a common electrode signal terminal of the array substrates. As a signal of a common electrode is generally stable, thus, a polar plate of a capacitor in a sensor unit may be set as the common electrode, to ensure high stability of touch control in the capacitive touch control stage.

In some embodiments, the conductive type of the first switch transistor is different from the conductive type of the second switch transistor, and the conductive type of the second switch transistor is the same as that of the $N^{th}$ switch transistor. That is, when the first switch transistor is a N-type transistor, the second to $N^{th}$ switch transistors are P-type transistors; or when the first switch transistor is a P-type transistor, the second to $N^{th}$ switch transistors are N-type transistors. The first to $N^{th}$ switch transistors are thin film transistors (TFTs). When the conductive type of the first switch transistor is different from the conductive type of the second switch transistor, and the conductive type of the second switch transistor is the same as that of the $N^{th}$ switch transistor, the first control signal terminal and the second control signal terminal may be the same control terminal.

In some embodiments, TFTs of the array substrate may be TFTs with a bottom gate or TFTs with a top gate, which is not limited in the present disclosure and determined according to practical requirements.

Figure 5:
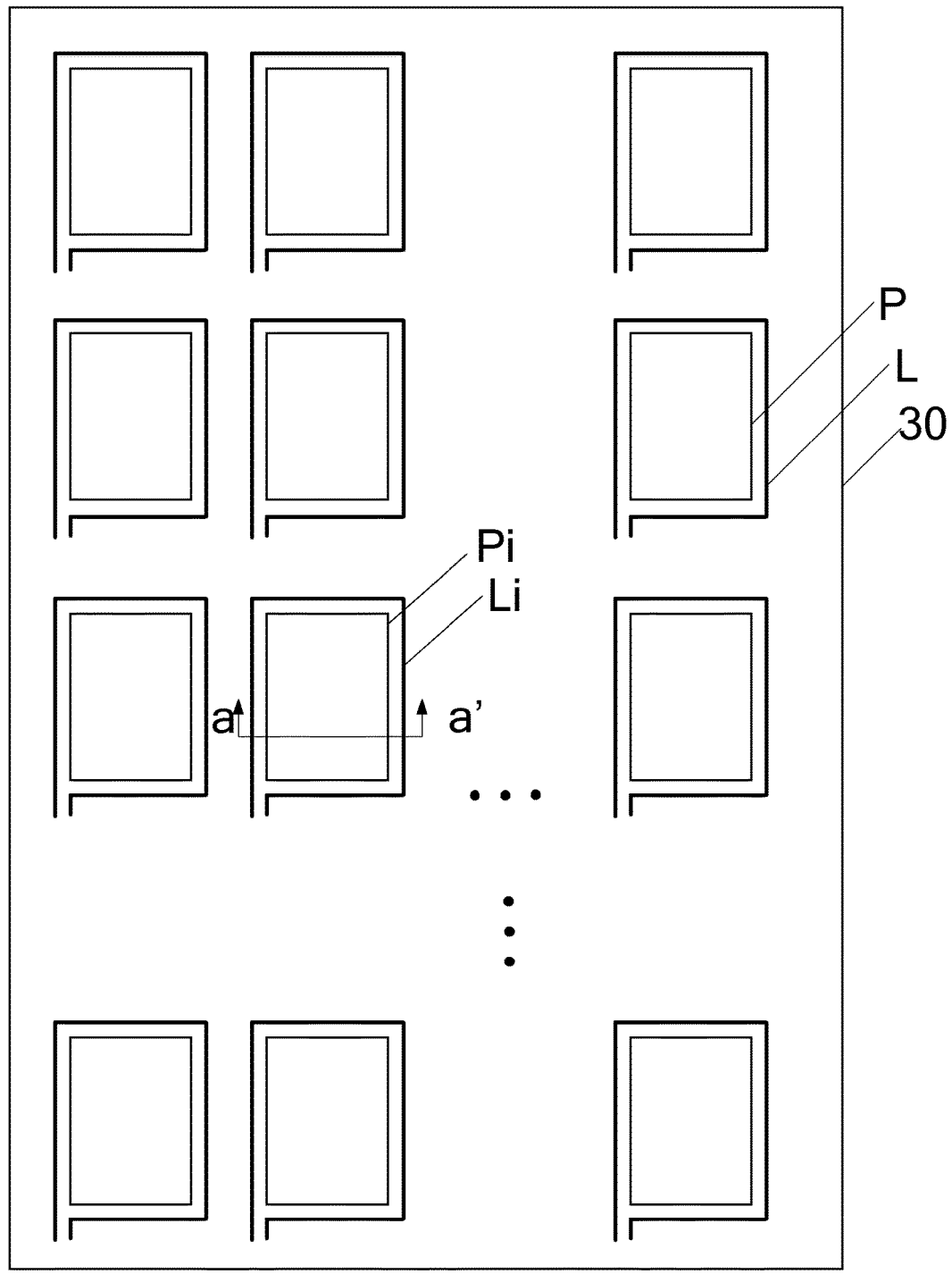
FIG. 5 schematically illustrates a structural diagram of an array substrate according to an embodiment of the present disclosure.

In the embodiments of the present disclosure, the capacitors, the inductors and the connection units may be disposed in a display region of the array substrate, and the signal detection terminals and other components may be disposed in a non-display region of the array substrate, which may prevent the aperture of the array substrate from being affected. FIG. 5 schematically illustrates a structural diagram of an array substrate according to an embodiment of the present disclosure.

The array substrate includes: N number of pixel electrodes P; coils L surrounding each of the pixel electrodes P; and a first electrode 30 insulated from the N number of pixel electrodes P, wherein the coil Li surrounding the $i^{th}$ pixel electrode Pi is an inductor of an $i^{th}$ sensor unit, and the coil Li surrounding the $i^{th}$ pixel electrode Pi and the first electrode 30 constitute a capacitor of the $i^{th}$ sensor unit.

In some embodiments, the coils serving as the inductors in the array substrate and the pixel electrodes may be disposed in the same conductive layer, or in different conductive layers. More details can be found in FIGS. 6a to 6c.

Figure 6A:
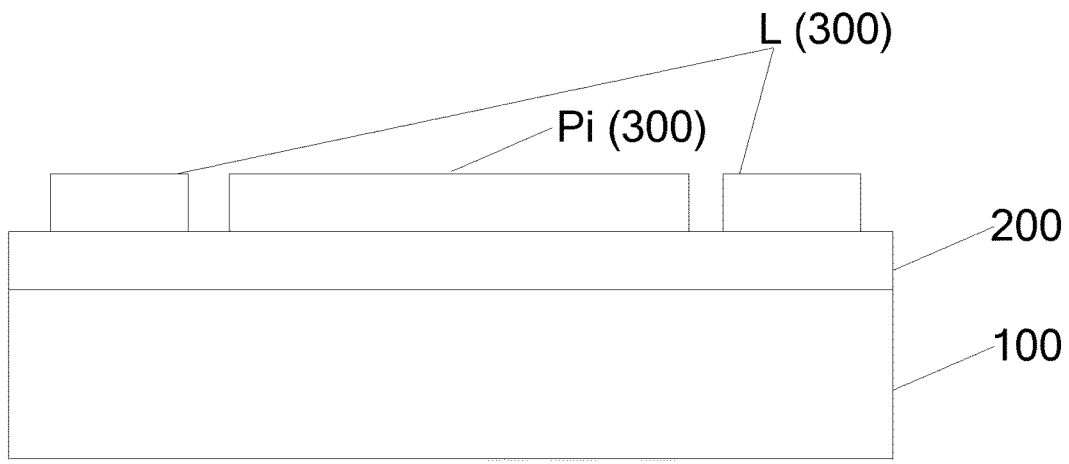
FIG. 6a schematically illustrates a cross-section view of FIG. 5 along an aa' direction according to an embodiment of the present disclosure.

In some embodiments, the coils serving as the inductors and the pixel electrodes are disposed in a same conductive layer. Referring to FIG. 6a, FIG. 6a schematically illustrates a cross-section view of FIG. 5 along an aa' direction according to an embodiment of the present disclosure.

Figure 6B:
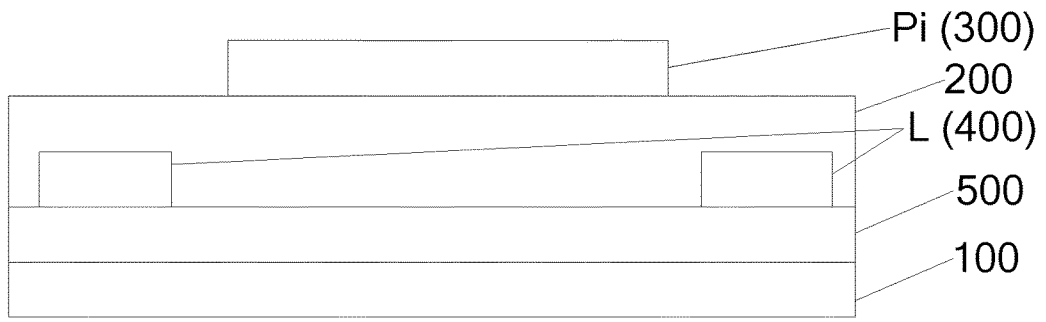
FIG. 6b schematically illustrates a cross-section view of FIG. 5 along an aa' direction according to an embodiment of the present disclosure.
Figure 6C:
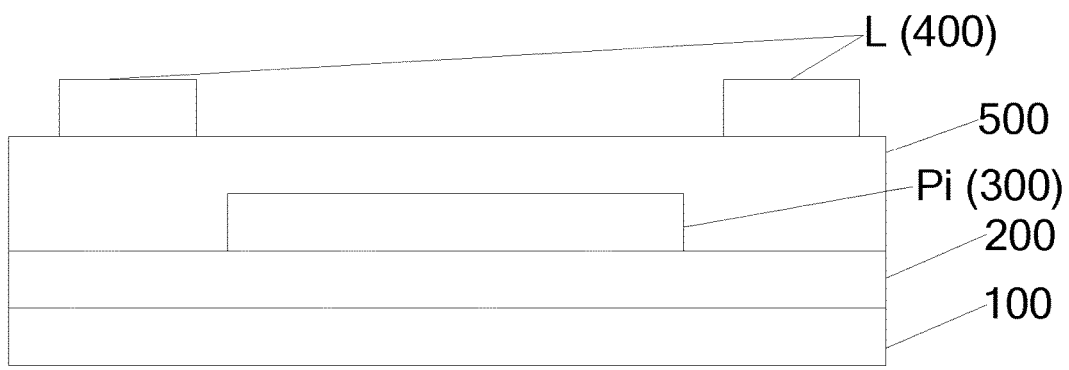
FIG. 6c schematically illustrates a cross-section view of FIG. 5 along an aa' direction according to an embodiment of the present disclosure.

With reference to FIGS. 6a to 6c, the array substrate includes: a first electrode 100; a first insulating layer 200 formed on a surface of the first electrode 100; and a pixel electrode layer 300 formed on a surface of the first insulating layer 200 which is away from the surface of the first electrode 100, the pixel electrode layer 300 including N number of pixel electrodes Pi and coils Li.

In some embodiments, the coils serving as the inductors and the pixel electrodes are disposed in different conductive layers. FIG. 6b schematically illustrates a cross-section view of FIG. 5 along an aa' direction according to an embodiment of the present disclosure. The array substrate includes: a first electrode 100; a second insulating layer 500 formed on a surface of the first electrode 100; a counter electrode layer 400 formed on a surface of the second insulating layer 500; a first insulating layer 200 formed on the surface of the second insulating layer 500 and covering the counter electrode layer 400; and a pixel electrode layer 300 formed on a surface of the first insulating layer 200 which is away from the surface of the second insulating layer 500, the pixel electrode layer 300 including N number of pixel electrodes Pi.

Referring to FIG. 6c, FIG. 6c schematically illustrates a cross-section view of FIG. 5 along an aa' direction according to an embodiment of the present disclosure. The array substrate includes: a first electrode 100; a first insulating layer 200 formed on a surface of the first electrode 100; a pixel electrode layer 300 formed on a surface of the first insulating layer 200, the pixel electrode layer 300 including N number of pixel electrodes Pi; a second insulating layer 500 formed on the surface of the first insulating layer 200 and covering the pixel electrode layer 300; and a counter electrode layer 400 formed on a surface of the second insulating layer 500 which is away from the surface of the first insulating layer 200.

Referring to FIGS. 6b and 6c, coils Li are disposed in the counter electrode layer 400, the coil Li surrounding the $i^{th}$ pixel electrode Pi is an inductor of an $i^{th}$ sensor unit, and the coil Li surrounding the $i^{th}$ pixel electrode Pi and the first electrode 100 constitute a capacitor of the $i^{th}$ sensor unit.

In some embodiments, the first electrode may be a common electrode, which may ensure high stability of touch control in a capacitive touch control stage.

Figure 7:
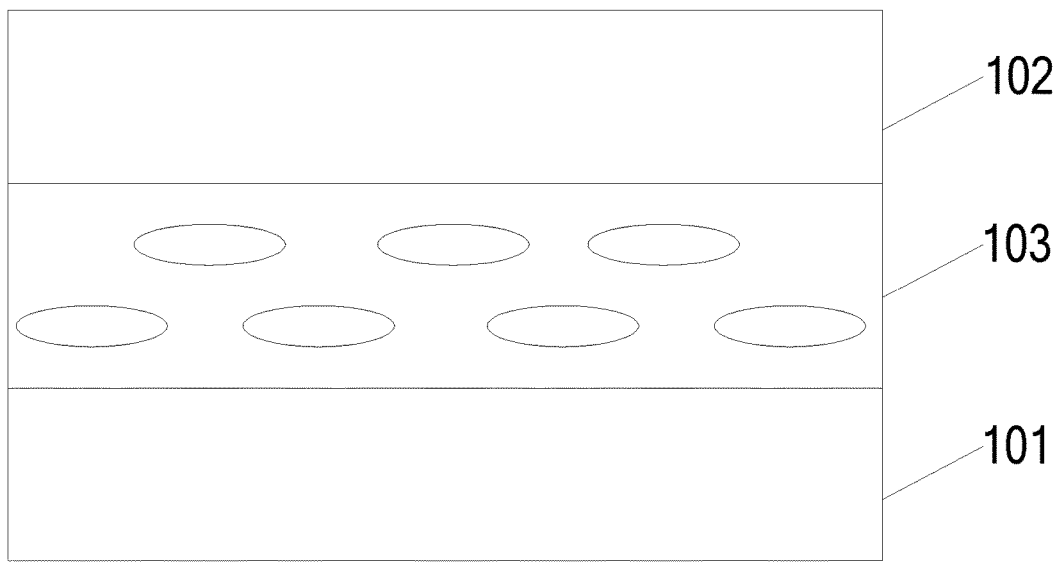
FIG. 7 schematically illustrates a structural diagram of a display panel according to an embodiment of the present disclosure.

In an embodiment, a display panel is provided. FIG. 7 schematically illustrates a structural diagram of a display panel according to an embodiment of the present disclosure. The display panel includes: an array substrate 101 provided in any one of the above-mentioned embodiments; a color film substrate 102; and a liquid crystal layer 103 between the array substrate 101 and the color film substrate 102.

Figure 8:
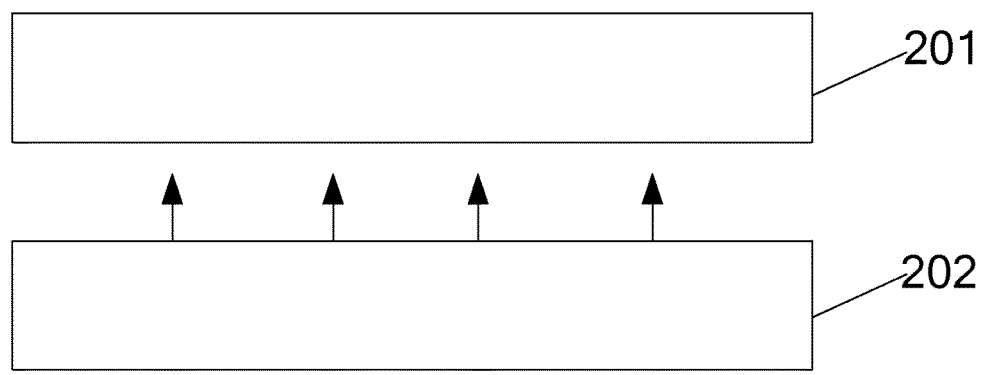
FIG. 8 schematically illustrates a structural diagram of a display device according to an embodiment of the present disclosure.

In an embodiment, a display device is provided. FIG. 8 schematically illustrates a structural diagram of a display device according to an embodiment of the present disclosure. The display device includes: a display panel 201 provided in any one of the above-mentioned embodiments; and a backlight module 202 disposed on a surface of the display panel 201 which surface is adapted to receive lights, the arrows herein schematically illustrate the light emitted by the backlight module 202.

In the embodiments of the present disclosure, an array substrate, a display panel and a display device are provided. The array substrate includes: N sensor units; N signal detection terminals; a first control signal terminal; and a reference signal terminal, wherein the $i^{th}$ sensor unit includes an inductor, a capacitor and a first switch transistor, a first terminal of the inductor and a first polar plate of the capacitor are both connected with the $i^{th}$ signal detection terminal, a second terminal of the inductor is connected with a first terminal of the first switch transistor, a second polar plate of the capacitor and a second terminal of the first switch transistor are both connected with the reference signal terminal, and a control terminal of the first switch transistor is connected with the first control signal terminal. The array substrate can work on a capacitive touch control stage and an inductive touch control stage. During the capacitive touch control stage, the first switch transistor is turned off under the control of the first control signal terminal, and the $i^{th}$ signal detection terminal outputs a capacitive detection signal; and during the inductive touch control stage, the first switch transistor is turned on under the control of the first control signal terminal, and the $i^{th}$ signal detection terminal outputs an inductive detection signal, wherein N is a positive integer, and $1 \leq i \leq N$.

From above, in the embodiments of the present disclosure, the sensor units are integrated on the array substrate, which differs from mounting a touch screen on a display device in the existing techniques. Thus, the thickness of the display device may be reduced effectively. Both the capacitive touch control mode and the inductive touch control mode are provided for the sensor units, and the sensor units can be switched between the two modes, thus, the touch control mode can be selected according to practical application scenarios. Therefore, the display device using such an array substrate integrated with such sensor units can be widely used in various circumstances.

Although the present disclosure has been disclosed above with reference to preferred embodiments thereof, it should be understood that the disclosure is presented by way of example only, and not limitation. Those skilled in the art can modify and vary the embodiments without departing from the scope of the present disclosure. Therefore, the protection scope of the present disclosure is subject to the scope defined by the claims.

What is claimed is:

1. An array substrate, comprising:
   N sensor units;
   N signal detection terminals, wherein N is a positive integer equal to 1 or greater than 1;
   a first control signal terminal;
   a reference signal terminal;
   wherein each sensor unit comprises:
     an inductor, a capacitor and a first switch transistor, wherein a first terminal of the inductor and a first polar plate of the capacitor are both connected with a corresponding signal detection terminal, wherein each sensor unit has a different corresponding signal detection terminal;
     a second terminal of the inductor is connected with a first terminal of the first switch transistor, a second polar plate of the capacitor and a second terminal of the first switch transistor are both connected with the reference signal terminal, and a control terminal of the first switch transistor is connected with the first control signal terminal;
   during a capacitive touch control stage, the first switch transistor is turned off under the control of the first control signal terminal, and the corresponding signal detection terminal outputs a capacitive detection signal; and
   during a inductive touch control stage, the first switch transistor is turned on under the control of the first control signal terminal, and the corresponding signal detection terminal outputs an inductive detection signal.

2. The array substrate according to claim 1, further comprising a connection unit and a second control signal terminal,
   wherein a control terminal of the connection unit is connected with the second control signal terminal;
   during the capacitive touch control stage, the first switch transistors are turned off under the control of the first control signal terminal, the connection unit connects the capacitors in the N sensor units in parallel under the control of the second control signal terminal, and at least one of the N signal detection terminals outputs a capacitive detection signal; or during the inductive touch control stage, the first switch transistors are turned on under the control of the first control signal terminal, the connection unit disconnects the connection of the capacitors in the N sensor units under the control of the second control signal terminal, and each of the N signal detection terminals outputs an inductive detection signal.

3. The array substrate according to claim 2, wherein N is 2 and the connection unit comprises a second switch transistor, wherein a first terminal of the second switch transistor is connected with a first polar plate of a capacitor in a first sensor unit, a second terminal of the second switch transistor is connected with a first polar plate of a capacitor in a second sensor unit, and a control terminal of the second switch transistor is connected with the second control signal terminal.

4. The array substrate according to claim 2, wherein N is an even number greater than three, wherein the connection units comprises $2^{nd}$ to $N^{th}$ switch transistors, a first terminal of the $j^{th}$ switch transistor is connected with a first polar plate of a capacitor in the $j-1^{th}$ sensor unit, a second terminal of the $j^{th}$ switch transistor is connected with a first polar plate of a capacitor in the $j^{th}$ sensor unit, and a control terminal of the $j^{th}$ switch transistor is connected with the second control signal terminal; and a first terminal of the $j+1^{th}$ switch transistor is connected with a first polar plate of a capacitor in the $j+1^{th}$ or $j+2^{th}$ sensor unit, a second terminal of the $j+1^{th}$ switch transistor is connected with the first polar plate of the capacitor in the $j^{th}$ sensor unit, and a control terminal of the $j+1^{th}$ switch transistor is connected with the second control signal terminal, wherein j is an even number greater than 1 and not greater than N.

5. The array substrate according to claim 2, wherein N is an odd number greater than two, wherein the connection units comprises $2^{nd}$ to $N^{th}$ switch transistors, a first terminal of the $j^{th}$ switch transistor is connected with a first polar plate of a capacitor in the $j-1^{th}$ sensor unit, a second terminal of the $j^{th}$ switch transistor is connected with a first polar plate of a capacitor in the $j^{th}$ sensor unit, and a control terminal of the $j^{th}$ switch transistor is connected with the second control signal terminal; and a first terminal of the $j+1^{th}$ switch transistor is connected with a first polar plate of a capacitor in the $j+1^{th}$ sensor unit, a second terminal of the $j+1^{th}$ switch transistor is connected with the first polar plate of the capacitor in the $j^{th}$ sensor unit, and a control terminal of the $j+1^{th}$ switch transistor is connected with the second control signal terminal, wherein j is an even number greater than 1 and less than N.

6. The array substrate according to claim 1, wherein the reference signal terminal is a common electrode signal terminal of the array substrate.

7. The array substrate according to claim 3, wherein a conductive type of the first switch transistor is different from a conductive type of the second switch transistor.

8. The array substrate according to claim 4, wherein a conductive type of the first switch transistor is different from a conductive type of the second switch transistor, and the conductive type of the second switch transistor is the same as that of the $N^{th}$ switch transistor.

9. The array substrate according to claim 5, wherein a conductive type of the first switch transistor is different from a conductive type of the second switch transistor, and the conductive type of the second switch transistor is the same as that of the $N^{th}$ switch transistor.

10. The array substrate according to claim 7, wherein the first control signal terminal and the second control signal terminal are a same control terminal.

11. The array substrate according to claim 8, wherein the first control signal terminal and the second control signal terminal are a same control terminal.

12. The array substrate according to claim 9, wherein the first control signal terminal and the second control signal terminal are a same control terminal.

13. The array substrate according to claim 1, comprising:
N pixel electrodes, wherein coils surround each pixel electrode;
a first electrode insulated from the N pixel electrodes,
wherein the coil surrounding a pixel electrode is an inductor of a sensor unit, and the coil surrounding a pixel electrode and the first electrode constitute a capacitor of a sensor unit.

14. The array substrate according to claim 13, comprising:
the first electrode;
a first insulating layer formed on a surface of the first electrode; and
a pixel electrode layer formed on a surface of the first insulating layer which is away from the surface of the first electrode, the pixel electrode layer comprising the N pixel electrodes and the coils.

15. The array substrate according to claim 13, comprising:
the first electrode;
a second insulating layer formed on a surface of the first electrode;
a counter electrode layer formed on a surface of the second insulating layer;
a first insulating layer formed on the surface of the second insulating layer and covering the counter electrode layer; and
a pixel electrode layer formed on a surface of the first insulating layer which is away from the surface of the second insulating layer, the pixel electrode layer comprising the N pixel electrodes,
wherein the coils are disposed in the counter electrode layer.

16. The array substrate according to claim 13, comprising:
a first electrode;
a first insulating layer formed on a surface of the first electrode;
a pixel electrode layer formed on a surface of the first insulating layer, the pixel electrode layer comprising the N pixel electrodes;
a second insulating layer formed on the surface of the first insulating layer and covering the pixel electrode layer; and
a counter electrode layer formed on a surface of the second insulating layer which is away from the surface of the first insulating layer,
wherein the coils are disposed in the counter electrode layer.

17. The array substrate according to claim 13, wherein the first electrode is a common electrode.

18. A display panel, comprising the array substrate according to claim 1.

19. A display device, comprising the display panel according to claim 18.

* * * * *